United States Patent
Gunning et al.

(10) Patent No.: US 11,775,275 B2
(45) Date of Patent: Oct. 3, 2023

(54) SECURE CODE IMAGE DISTRIBUTION

(71) Applicant: Hewlett-Packard Development Company, L.P., Spring, TX (US)

(72) Inventors: Chris R Gunning, Boise, ID (US); Joshua Serratelli Schiffman, Bristol (GB); Shivaun Albright, Rocklin, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 279 days.

(21) Appl. No.: 17/298,593

(22) PCT Filed: Jan. 30, 2019

(86) PCT No.: PCT/US2019/015878
§ 371 (c)(1),
(2) Date: May 30, 2021

(87) PCT Pub. No.: WO2020/159497
PCT Pub. Date: Aug. 6, 2020

(65) Prior Publication Data
US 2022/0147334 A1    May 12, 2022

(51) Int. Cl.
*G06F 8/61* (2018.01)
*G06F 8/65* (2018.01)
*G06F 21/60* (2013.01)
*G06F 21/62* (2013.01)

(52) U.S. Cl.
CPC ............... *G06F 8/63* (2013.01); *G06F 8/65* (2013.01); *G06F 21/602* (2013.01); *G06F 21/6227* (2013.01)

(58) Field of Classification Search
None
See application file for complete search history.

(56) References Cited

U.S. PATENT DOCUMENTS

| | | | |
|---|---|---|---|
| 7,010,624 B1 | 3/2006 | Zhou et al. | |
| 7,146,609 B2 | 12/2006 | Thurston et al. | |
| 8,032,881 B2 | 10/2011 | Holmberg et al. | |
| 8,898,477 B2 | 11/2014 | Prevost et al. | |
| 9,276,752 B2 | 3/2016 | Abraham et al. | |
| 2005/0251799 A1 | 11/2005 | Wang | |
| 2009/0259855 A1 | 10/2009 | De Cesare et al. | |
| 2012/0198434 A1 | 8/2012 | Dirstine et al. | |

(Continued)

FOREIGN PATENT DOCUMENTS

| RU | 2620730 C1 | 5/2017 |
|---|---|---|
| WO | WO 2017205482 A1 | 11/2017 |

*Primary Examiner* — Qing Chen
(74) *Attorney, Agent, or Firm* — Michael Dryja (57) ABSTRACT

Secure code image delivery may include encrypting, using an invariant content encryption key, an invariant portion of a code image for a set of electronic devices to generate an encrypted invariant potion of the code image. A first variant of a variant portion of the code image may be encrypted using a first variant content encryption key to generate a first encrypted variant portion. A second variant of a variant portion of the code image may be encrypted using a second variant content encryption key to generate a second encrypted variant portion. A code image bundle may be generated including the encrypted invariant portion, the first encrypted variant portion, and the second encrypted variant portion.

15 Claims, 5 Drawing Sheets

(56) References Cited

U.S. PATENT DOCUMENTS

| 2017/0085532 | A1  | 3/2017 | Chan et al. |
| 2018/0121191 | A1  | 5/2018 | Fodor |
| 2018/0191507 | A1* | 7/2018 | Blankenbeckler ............................ H04N 21/4405 |
| 2019/0156029 | A1* | 5/2019 | Ashey .................... G06F 21/563 |

* cited by examiner

SECURE CODE IMAGE DISTRIBUTION

BACKGROUND

Despite attempts to improve security for electronic devices, attackers still find vulnerabilities that can be exploited to access information, lock information, alter the operation of an electronic device, or otherwise compromise a device. When an attacker identifies a vulnerability in code executed by an electronic device, same vulnerability can be exploited in other devices that employ the same code.

BRIEF DESCRIPTION OF THE DRAWINGS

Examples will now be described, by way of non-limiting example, with reference to the accompanying drawings, in which.

DETAILED DESCRIPTION

Diversifying code images for installation among electronic devices across a network may decrease the prevalence of attack vectors that may be exploited. For example, code diversity may reduce the probability that the same attack vector exists in multiple code images for an electronic device. Code diversity can be achieved by creating multiple variants of the code image for the device at build time of the code image. Code diversity can be implemented at granularity ranging from different variations in different models, different releases, or other granularity up to different variations for each electronic device in a collection of electronic devices.

Providing diverse code variations, however, may be vulnerable to attacks that are able to reverse engineer an encryption key. Accordingly, described herein are secure image delivery systems that securely deliver code variants to a collection of electronic devices. If an attacker is able to access a code image on an electronic device as described herein, only the variation installed on that device will be accessible. The security is achieved through encrypting variant portion of a code image with different content encryption keys. The content encryption keys are also encrypted using keys associated with electronic devices for which the associated variant code portion in intended. Accordingly, accessing a content encryption key or variant portion of a code image on one electronic system provides no access to other content encryption keys or variant portions of code images.

A secure image delivery system delivers a code image bundle to the collection of electronic devices. Electronic devices may include any combination of mechanical or electronic devices that execute code during operation. The electronic devices may by physical or virtual devices operating firmware or software instructions to perform various operations. Example electronic devices may include computers, printers, printing systems, copiers, scanners, mobile devices, vehicles, connected IoT (internet of things) devices, or other electronic devices with one or more components implementing operations through execution of code.

Electronic devices receiving the code image bundle may access a variant intended for that electronic device, but not access other variants. As described further below, the code image bundle may include an invariant portion that can be accessed by each of the collection of electronic devices and multiple variant portions that can each be accessed by a subset of intended electronic devices. For example, a subset of intended electronic devices may be able to decrypt a variant portion that other electronic devices cannot.

As described herein, a code image may include binary code (or higher-level code) that may be installed on an electronic device. For example, the code image may include firmware or software to install on a collection of electronic devices over a network. Binary code may include a collection of computer instructions executable by a processor or controller. The code image may, as a result, have or be associated with a functionality defined by the actions resulting from execution of the computer instructions. The code image may also include an image signature, shell scripts, configuration data files, other initialization data used by the device, or other data used in execution.

Implementing a code diversity strategy may involve creating, storing, and/or transmitting multiple variants of the code image. To improve transmission or storage size of a code image, the code image may be separated into invariant and variant portions. The invariant portion may be used by each electronic device and different variant portions may be used by different subsets of electronic devices. In some examples, portions of code that are more vulnerable to attack may be selected as the variant portion.

A variation generator may create variations during the build process by running post-processing operations on a code image. The code image may include an operating system, device drivers, kernel libraries, and other foundational portions of the instructions for an electronic device. In some examples, the executed prost-processing operations create a variant image which is functionally equivalent to the original code image but with randomization of library, function, and sub-function blocks within the image. This improves the security strength of each variation since an attack (e.g. a code injection attack) which may be performed on one variant is far less likely to be successful on any other variant.

The difference between each variant and the unmodified code image can be represented as a set of patches. The overall image can consist of the base code image (which becomes part of the invariant image) and the patch sets. Each patch set is the variant data that is bound to a subset of electronic devices. Depending on the size of the patches, it may be possible to include many patches in the overall code image while still keeping the code image size within an acceptable ratio of a code image with no variants. When an electronic device processes the variant portion of a firmware upgrade, it applies the patch set in the variant portion to the base code image that is in the invariant portion of the upgrade.

In some examples, the firmware bundle is constructed and signed by assembling parts so that they are accessible to intended electronic devices and not others. To construct the bundle, the public keys of the collection of electronic devices are used to encrypt the associated variant portions of the code image. For example, this may be at the time the code image is generated. In other cases, it may not be known until later, such as when an intermediate system is preparing to provide the code image to a fleet of electronic devices.

The bundle can then be placed in common locations for downloading or pushed to individual electronic devices or management tools.

To distribute variant portion of a code image, a system uses knowledge of the public key of a target electronic device to encrypt associated variant portions. The system may use knowledge of multiple public keys of the target electronic device in some examples. In some examples, the system may use a characteristic of an electronic device to map variants to the electronic device. Each electronic device therefore has keys assigned at manufacturing or another point of distribution of the electronic device and use those keys in combination to decrypt its variant code image.

In some examples, determining which variant portion is to be installed on an electronic device, a system can use one or more characteristics of the electronic devices. A characteristic may include a serial number, model number, release number, manufacture date, manufacture time, combination of such, or other feature that can be used to generate a mapping of variants to electronic devices. For example, a system may create 10,000 variant code images for a code image. In an example using a serial number, the last four digits of the device serial number might be used to determine which variant code image is installed on each electronic device. Thus, a device with a serial number that ends with "0001" may install variant #1, "0002" may install variant #2, and so forth. The electronic devices may then access the appropriate variant code image in a code image bundle based on the characteristic.

It may be burdensome for the bundle creator to manage 10,000 different keys. To simplify the encryption keys that are tracked and applied to each of the code images, the system may use one or more characteristics of the electronic devices. Accordingly, a system may reduce the number of keys to manage by encrypting each variant with multiple keys in a defined order. In this example, each variant could be encrypted first with a key corresponding to the ones digit of a serial number, then encrypted with one corresponding to the tens digit of a serial number, then a key for the hundreds digit of a serial number, and finally a key for the thousands digit of a serial number. In this example, the bundle creator only needs to manage 40 different keys, since each digit position has a possibility of ten different keys.

Distributing 10,000 variations of a variant code image portion would thus be performed using four public keys, one for each of the digit positions. An electronic device then uses its serial number to determine which entry in the list to access. The encryption keys installed stored on the electronic device (for example, installed during manufacturing) can be used to decrypt an encryption key distributed with the associated variation of the variant portion of the code image.

In some examples, electronic devices may have individual keys and the keys associated with characteristics of the electronic device. A secure image delivery system may then distribute variations to each electronic device individually using the individual keys, or to subsets of electronic devices using the characteristics of those electronic devices. For example, an administrator system may determine the level of code diversity to be used based on the level of security needed for a code image update. The code image bundle may include a tag to indicate which types of keys are in use.

In some examples, the code image bundle may be made publicly available to devices and accessed to update the code of the electronic devices. Code image updates may also be requested by an administrator service associated with a number of electronic devices. For example, a secure image delivery system may receive a set of electronic devices from an administrator that are to be updated. The secure image delivery system can then create a code image bundle associated with the requested set of electronic devices. This may reduce the size of the code image bundle generated. The administrator service may then provide the code image bundle to the associated electronic devices. The administrator service may also unpack the code image bundle and provide portions of the code image bundle associated with an electronic device to that device to decrypt and install. In some examples, an administrator service may have access to encryption keys of each of the associated electronic devices and may combine invariant and variant portions of a code image bundle for an electronic device rather than sending the electronic devices.

Figure 1:
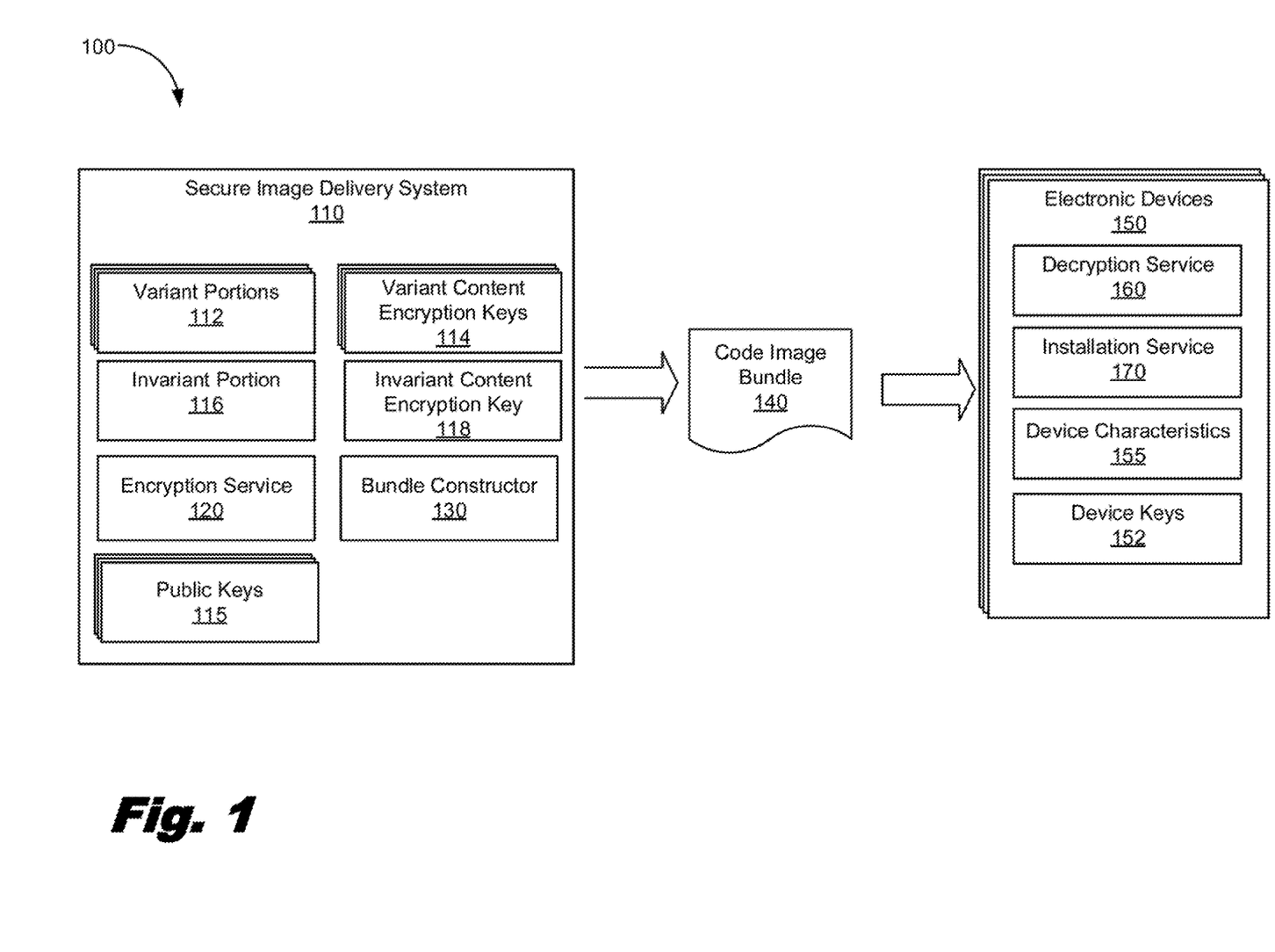
FIG. 1 illustrates a block diagram of a system for code image distribution according to examples.

FIG. 11 is a block diagram showing a secure image delivery environment 100, according to some examples. A secure image delivery system 110 generates a code image bundle 140 which is transmitted to electronic devices 150. An electronic device 150 then reconstructs a complete code image for installation. For clarity, not all elements of a complete image delivery environment 100 is shown in FIG. 1. An example code image bundle 140 is shown in more detail with reference to FIG. 2.

The secure image delivery system 110 includes data resources to store variant portions 112 of a code image, invariant portions 116 of the code image, variant content encryption keys 114, an invariant content encryption key 118. The secure image delivery system 110 may have an encryption service 120 that encrypts respective portions of the code image, and a bundle constructor 130 that generates a code image bundle 140 for transmission to electronic devices 150.

The secure image delivery system 110 may include resources associated with developing, building, testing, or deploying code packages. For example, the secure image delivery system may provide access to a code image to enable generating updates to a code image that has been deployed. In some examples, the secure image delivery system 110 may receive a code image to deploy from an external source. For example, the secure image delivery system 110 may receive a code image from a separate system that enables software or firmware development. The secure image delivery system 110 may receive a complete code image and generate an invariant portion 116 and variant portions 112, or the secure image delivery system 110 may receive the variant portions 112 and the invariant portion 116 from a separate system that generates the respective portions.

In some examples, the secure image delivery system 110 may be associated with a manufacturer and/or service provider of electronic devices 150 and may be utilized to deploy firmware updates associated with the electronic devices 150. The secure image delivery system 110 may be a web server associated with a website that communicates with electronic devices 150 or delivers updates to electronic devices 150. In various examples, secure image delivery system 110 may push the code image to electronic devices 150 or electronic devices 150 may request and pull a code image from the secure image delivery system 110.

A code image as described herein may include a software and/or firmware code image for an electronic device 150. For example, the code image may include a software and/or firmware update for printing devices. A code image may include a plurality of distinct and/or separate images, bundles or package files. The package files may correspond to individual components, functions, application-specific integrated circuits (ASICS), and/or processors of an electronic device 150. For example, the electronic device 150 may include distinct components, functions, ASICS, and/or processors that control the print engine of a printer, manage a control panel of a printer, manage an embedded fax of a printer, manage a scanner of a printer, manage a paper handling mechanism of a printer, manage a bin of a printer, manage a tray of a printer, manage a stapler of a printer, and/or manage a finisher of a printer. The package files may include code corresponding to each of these distinct components, functions, ASICS, and/or processors. The code package may include separate package files for application code, connectivity/networking firmware, operating system firmware, print engine firmware, or other firmware for an electronic device 150.

Whether received as separate portions, or the variant portions 112 of the code image are generated by the secure image delivery system 110, the secure image delivery system 110 proceeds to generate the code image bundle 140 by encrypting variant portions 112 and the invariant portion 116 of the code image. So that each the electronic devices 150 can appropriately decrypt the variant portion 112 of the code image intended for the device, the secure image delivery system 110 may identify an electronic device 150 or a subset of the electronic devices 150 that is to receive each of the variant portions 112 of the code.

To identify electronic devices 150 that will receive a code image, the secure image delivery system 110 may receive a request for a code image for a set of devices or may store a set of devices that are associated with the code image. The variant portions 112 of the code image may be associated with an electronic device 150 or a subset of electronic devices 150. Accordingly, after identifying electronic devices 150 to receive the code image in code bundle 140, the secure image delivery system 110 identifies associated public keys 115 and associated variant content encryption keys 114. In some examples, the associated variant content encryption keys 114 may be generated by the secure image delivery system 110 as variant portions 112 of the code image are received or created by the secure image delivery system 110.

The encryption service 120 may then encrypt each of the variant portions 112 of the code images with an associated variant content encryption key 114. Accordingly, each of the variant portions 112 of the code image is encrypted with a different variant content encryption key 114. To protect the variant content encryption key 114 during transmission to electronic devices 150, the encryption service 120 may then encrypt the variant content encryption keys 114 using one or more public keys 115 associated with the variant portion 112 of the code image. The public keys 115 may correspond to private keys individual to electronic device 150 or may be associated with a subset of the electronic devices 150 that will receive the variant portion 112 of the code image.

The encryption service 120 also encrypts an invariant portion 116 of a code image. The encryption service 120 may use a public key that each of the electronic devices 150 hold a private key for or another private key. In some examples, the key used to encrypt the invariant portion 116 of the code image may be encrypted and included in the code image bundle 140. Accordingly, the electronic device 150 may decrypt the key during the same process of decrypting other portions of the code image bundle 140.

The bundle constructor 130 may build a code image bundle 140 including an encrypted invariant portion of the code image, a set of encrypted variant portions of the code image, a set of encrypted variant content encryption keys, and an encrypted variant content encryption key. The bundle constructor 130 packages the components of the code image bundle 140 to enable intended devices to identify and decrypt variant content encryption keys 114 and use those to decrypt the variant portions 112 of the code image.

In some examples, the bundle constructor 130 also creates a distinct digital signature for the code image bundle 140. Applying a digital signature on the code image bundle 140 may prevent tampering with the code image and allow authentication of the software and/or firmware code image as the authentic code image built by the originator. Creating the digital signature may include processing the code image bundle 140 with a hardware security module that contains a private key. A hash may be calculated on the code image bundle 140 and/or the package file constituents of the code image bundle 140. The private key may be used to calculate a digital signature value based on the hash. The resulting digital signature may then be appended to the complete code image bundle 140. As a result, the code image bundle 140 may include a plurality of package files and an appended digital signature.

The secure image delivery system 110 may deliver the code image bundle 140 to intended electronic devices 150 after the code image bundle 140 is completed. For example, the secure image delivery system 110 may provide the code image bundle 140 in response to a request from electronic devices 150 or may push the code image bundle 140 to associated electronic devices 150. In some examples, the secure image delivery system 110 may provide the code image bundle 140 through an intermediate system (not shown).

Electronic devices 150 may include any combination of mechanical or electronic devices that execute code during operation. The electronic devices 150 may by physical or virtual devices operating firmware or software instructions to perform various operations. Example electronic devices 150 may include computers, printers, printing systems, copiers, scanners, mobile devices, vehicles, connected IoT (internet of things) devices, or other electronic devices with one or more components implementing operations through execution of code. In some examples, the electronic devices 150 may be the same type of device, model of a device, or release of a model. The electronic devices 150 may also be different or unrelated devices. The electronic devices 150 receive the code image bundle 140 and decrypt associated variant portions 112 of the code image. The variant portions 112 and invariant portion 116 of the code image may then be combined and installed on the electronic devices 150.

The electronic devices 150 may include a decryption service 160, an installation service 170, device characteristics 155, and device keys 152. The electronic devices 150 receive a code image bundle 140 from a secure image delivery system 110. For example, the code image bundle 140 may include features as described further with reference to FIG. 2 below.

The electronic devices 150 identify an encrypted variant content encryption key associated with the electronic device. The identification may be based on a serial number of the electronic device, model of the electronic device, release of the electronic device, date of manufacture, or other device characteristics 155. For example, an electronic device may identify a variant content encryption key based on the first, last, or other portion of a serial number of the electronic device 150.

The electronic device 150 uses one or more device keys 152 to decrypt the encrypted variant content encryption key. The device keys 152 may be stored on the electronic device 150 at a manufacture time of the electronic device 150, setup of the electronic device 150, later delivery to the electronic device 150, or another time. In some examples, the electronic device 150 may have multiple sets of device keys 152 and the code image bundle 140 may include a tag or other indicator of which set of device keys 152 to use for the current distribution of a code image.

The electronic device 150 can then decrypt a variant portion of a code image using the decrypted content encryption key. The electronic device 150 may identify which variant portion of the code image to decrypt based on a similar identification as the identification of the encrypted variant content encryption key. For example, the same characteristic may be used in identification or the encrypted variant content encryption key may point to which variant portion of the code image it is associated with.

The electronic device 150 also decrypts an invariant portion of the code image. For example, the decryption service 160 may decrypt an encrypted invariant content encryption key using one of device keys 152. In some examples, the encrypted invariant content encryption key may be included in a package with the encrypted variant content encryption key.

The installation service 170 uses the decrypted invariant portion of the code image and the decrypted variant portion of the code image to construct a complete code image. To generate the complete code image, the variant portion of the code image may be applied as a patch to the invariant portion of the code image. In some examples, the invariant portion and the variant portion are different parts of the code image. The installation service 170 then installs the complete code image on the electronic device 150.

Figure 2:
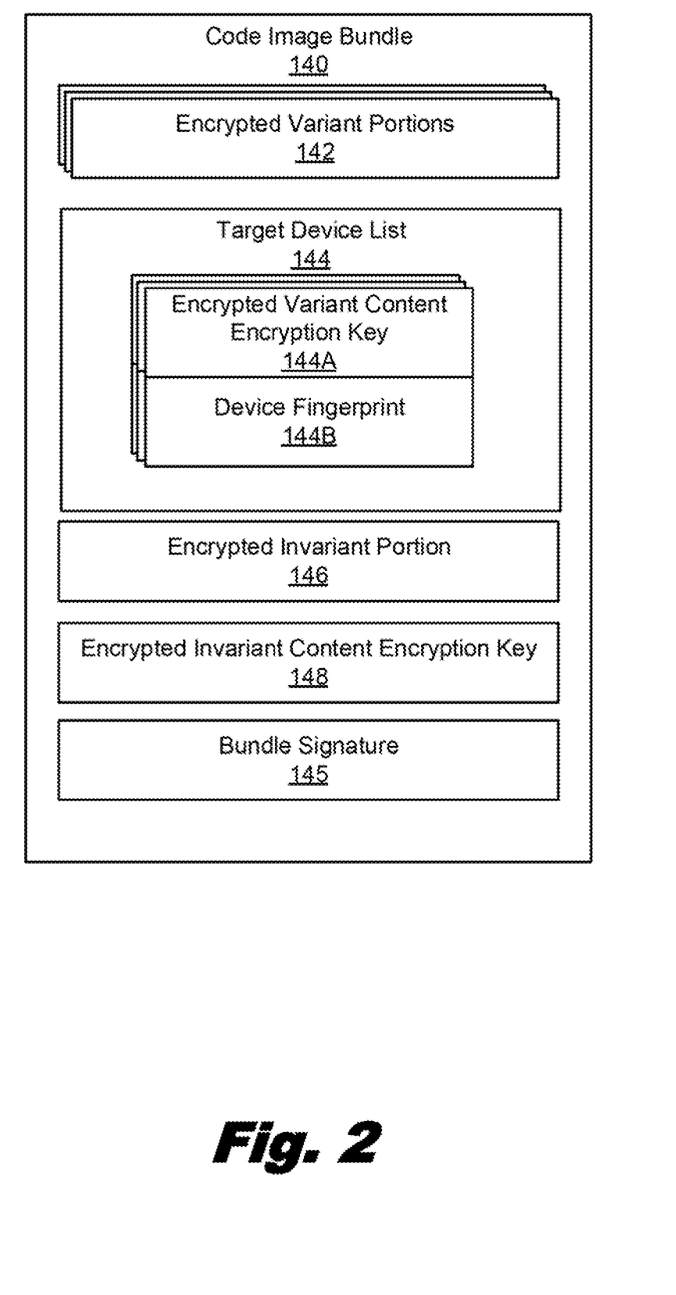
FIG. 2 illustrates a block diagram of a code image bundle according to examples.

FIG. 2 illustrates an example block diagram of a code image bundle 140 that may be generated by a secure image delivery system, such as secure image delivery system 110 shown in FIG. 1. The example image bundle 140 includes encrypted variant portions 142, target device list 144, an encrypted invariant portion 146, an encrypted invariant content encryption key 148, and a bundle signature 145. In various examples, the code image bundle 140 may have fewer or additional components or the components may be associated with one another in other manners.

The encrypted variant portions 142 include a set of encrypted code that are to be installed on one or more electronic devices. Each of the encrypted variant portions 142 may be encrypted with a different content encryption key that can be decrypted by target electronic devices for installation. The variant portions 142 may be intended for a single electronic device or for a subset of electronic device in a collection to which the code image bundle 140 is provided.

The target device list 144 includes a set of encrypted variant content encryption keys 144A and associated device fingerprints 144B. An electronic device may identify a device fingerprint that matches one or more characteristics of the electronic device. The encrypted variant content encryption keys 144A may be encrypted with a public key that matches a private key that is known to be on an electronic device based on the device fingerprints 144B. Accordingly, after identification of a device fingerprint 144B, the electronic device can use one or more private keys to decrypt the encrypted variant content encryption key 144A. In some examples, the device fingerprint 144B may also indicate which of the encrypted variant portions 142 of the code image the variant content encryption key can be used to decrypt.

The encrypted invariant portion 146 of the code image may be decrypted by each of the electronic devices that the code image bundle 140 is intended for. The encrypted invariant content encryption key 148 may be encrypted with a public key for which each of the target electronic devices have a corresponding private key, for instance. Accordingly, the electronic devices may decrypt the encrypted invariant content encryption key 148 using a different device key than is used for the encrypted variant content encryption key. In some examples, each electronic device 150, or group of electronic devices 150, may have different invariant content encryption key 148, which may add security by not having a single shared private encryption key to decrypt the invariant portion 146. The decrypted invariant content encryption key 148 may then be used to decrypt the encrypted invariant portion 146 of the code image.

In some examples, the code image bundle 140 includes a bundle signature 145. The bundle signature 145 may provide a hash, an encrypted hash, or other signature generated based on the other portions of the code image bundle 140. An electronic device can use the signature to verify that the code image bundle 140 was not tampered with prior to reaching the electronic device.

Figure 3:
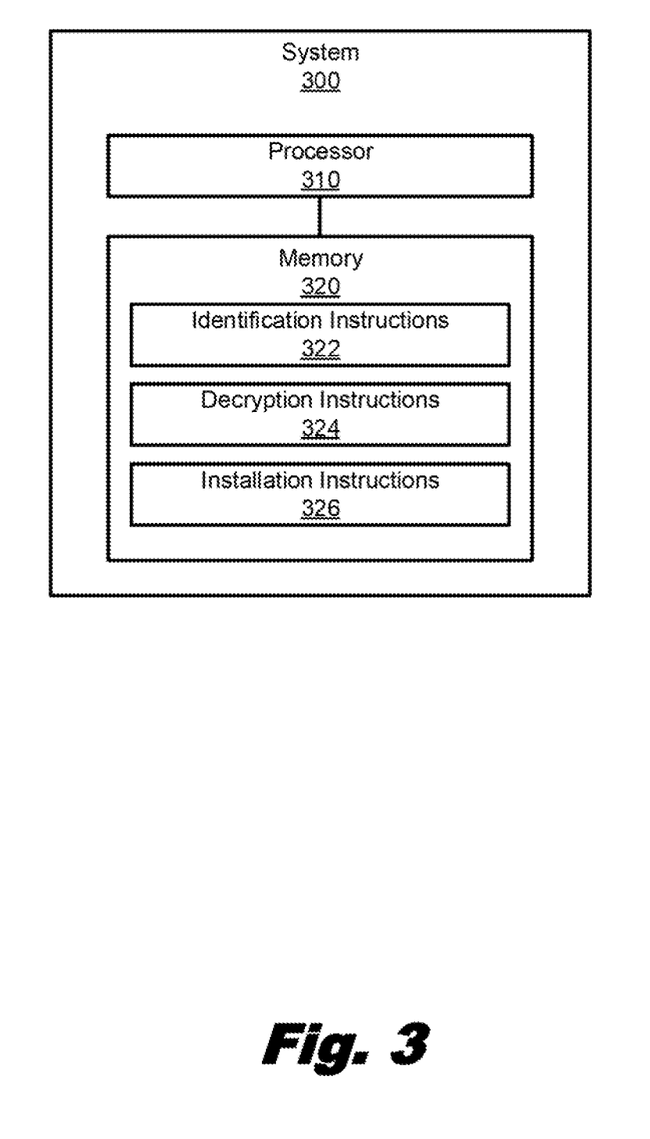
FIG. 3 illustrates a block diagram of a system for code image distribution according to examples.

FIG. 3 is a block diagram of an example system 300 for installation of code package variants, according to the present disclosure. System 300 may include at least one computing device that is capable of communicating with at least one remote system. In the example of FIG. 3, system 300 includes a processor 310 and a memory 320. Although the following descriptions refer to a single processor and a single computer-readable medium, the descriptions may also apply to a system with multiple processors and computer-readable mediums. In such examples, the instructions may be distributed (e.g., stored) across multiple computer-readable mediums and the instructions may be distributed (e.g., executed by) across multiple processors.

Processor 310 may be a central processing unit (CPUs), a microprocessor, and/or other hardware devices suitable for retrieval and execution of instructions stored in memory 320. In the example system 300, processor 310 may receive, determine, and send identification instructions 322, decryption instruction 324, and installation instructions 326 for installing code package variants. As an alternative or in addition to retrieving and executing instructions, processor 310 may include an electronic circuit comprising a number of electronic components for performing the functionality of an instruction in memory 320. With respect to the executable instruction representations (e.g., boxes) described and shown herein, it should be understood that part or all of the executable instructions and/or electronic circuits included within a particular box and/or may be included in a different box shown in the figures or in a different box not shown.

Memory 320 may be any electronic, magnetic, optical, or other physical storage device that stores executable instructions. Thus, memory 320 may be, for example, Random Access Memory (RAM), an Electrically-Erasable Programmable Read-Only Memory (EEPROM), a storage drive, an optical disc, and the like. Memory may be disposed within system 300, as shown in FIG. 2. In this situation, the executable instructions may be "installed" on the system 300.

Identification instructions 322 stored on memory 320 may, when executed by the processor 310, cause the processor 310 to identify an encrypted content encryption key associated with an electronic device from a set of encrypted content encryption keys. The identification may be based on one or more characteristics of the electronic device. The decryption instructions 324 may cause the processor to decrypt the identified content encryption key using a private key of the electronic device and decrypt an encrypted variant code image associated with the electronic device using the decrypted content encryption key. The installation instructions 326 may cause the processor to combine the variant portion of the code image with an invariant portion of the code image and install a combine code image on the electronic device. In various examples, the memory 320 may include additional sets of instructions to cause the processor 310 to perform additional functions.

Figure 4:
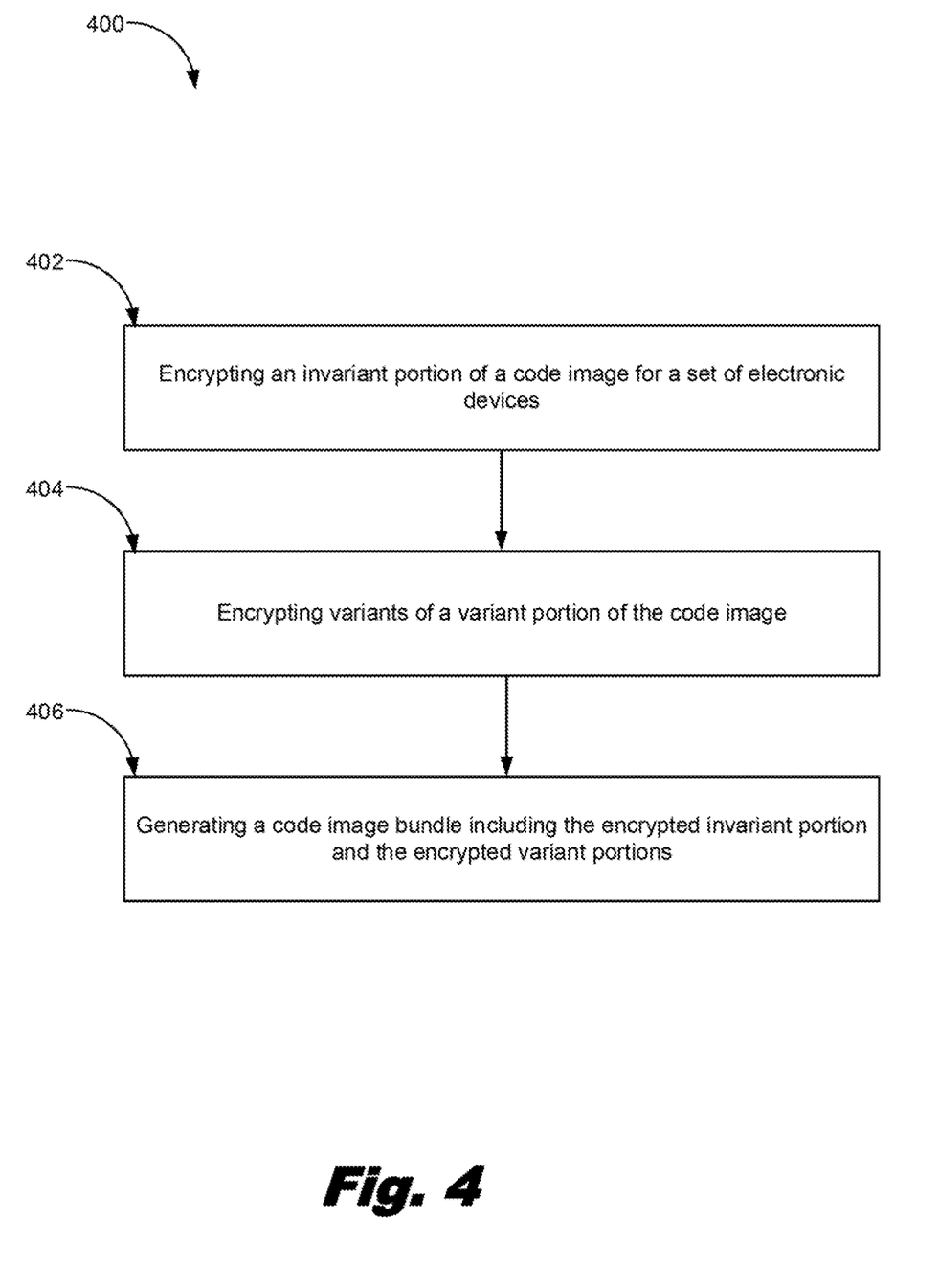
FIG. 4 is a flow diagram outlining an example method of code image distribution according to examples.

FIG. 4 illustrates an example flow diagram 400 that may be performed to generate a code image bundle. For example, the flow diagram may be performed by systems as described with reference to FIG. 1 above. In various examples, the processes described in reference to flow diagram 400 may be performed in a different order or the flow diagram may include fewer or additional blocks than are shown in FIG. 4.

Beginning in block 402, a secure image delivery system encrypts an invariant portion of a code image for a set of electronic devices. The encryption may be performed using an invariant content encryption key. The invariant portion of the code image may be a large portion of a code image for an update that can be modified or combined with a variant portion of a code image to generate a complete code image. In some examples, the secure image delivery system may generate the invariant portion of the code image from a complete code image.

In block 404, the secure image delivery system encrypts variants of a variant portion of the code image. The encryption may be performed using a different variant content encryption key for each of the variants in a set of variants portions. For example, the secure image delivery system may encrypt a first variant portion of the code image with a first content encryption key and a second variant portion of the code image with a second content encryption key. Other variant portions may be encrypted using additional variant content encryption key. In some examples, the secure image delivery system may generate the set of variant portions of the code image from a complete code image.

The variant content encryption keys used to encrypt the variant portion of the code image may also be encrypted. The encryption for the variant content encryption keys may be set based on intended electronic devices of different variants of the code image. For example, an electronic device may have a private key for which the secure image delivery system tracks and has a corresponding public key. The secure image delivery system may use the public key associated with a target electronic device to encrypt the content encryption key for decryption at the electronic device. The invariant content encryption key may also be encrypted for delivery to electronic devices. For example, the invariant content encryption key may be encrypted with a key pair that is known for each of the intended electronic devices. In some examples, the invariant content encryption key may be encrypted with other keys such as the variant content encryption key or the public key of an electronic device.

In block 406, the secure image delivery system generates a code image bundle including the encrypted invariant portion of the code image and the encrypted variant portions of the code image. The code image bundle may also include encrypted variant content encryption keys, an encrypted invariant content encryption key, a signature generated for the code image bundle, or other components to enable secure decryption and installation at electronic devices.

Figure 5:
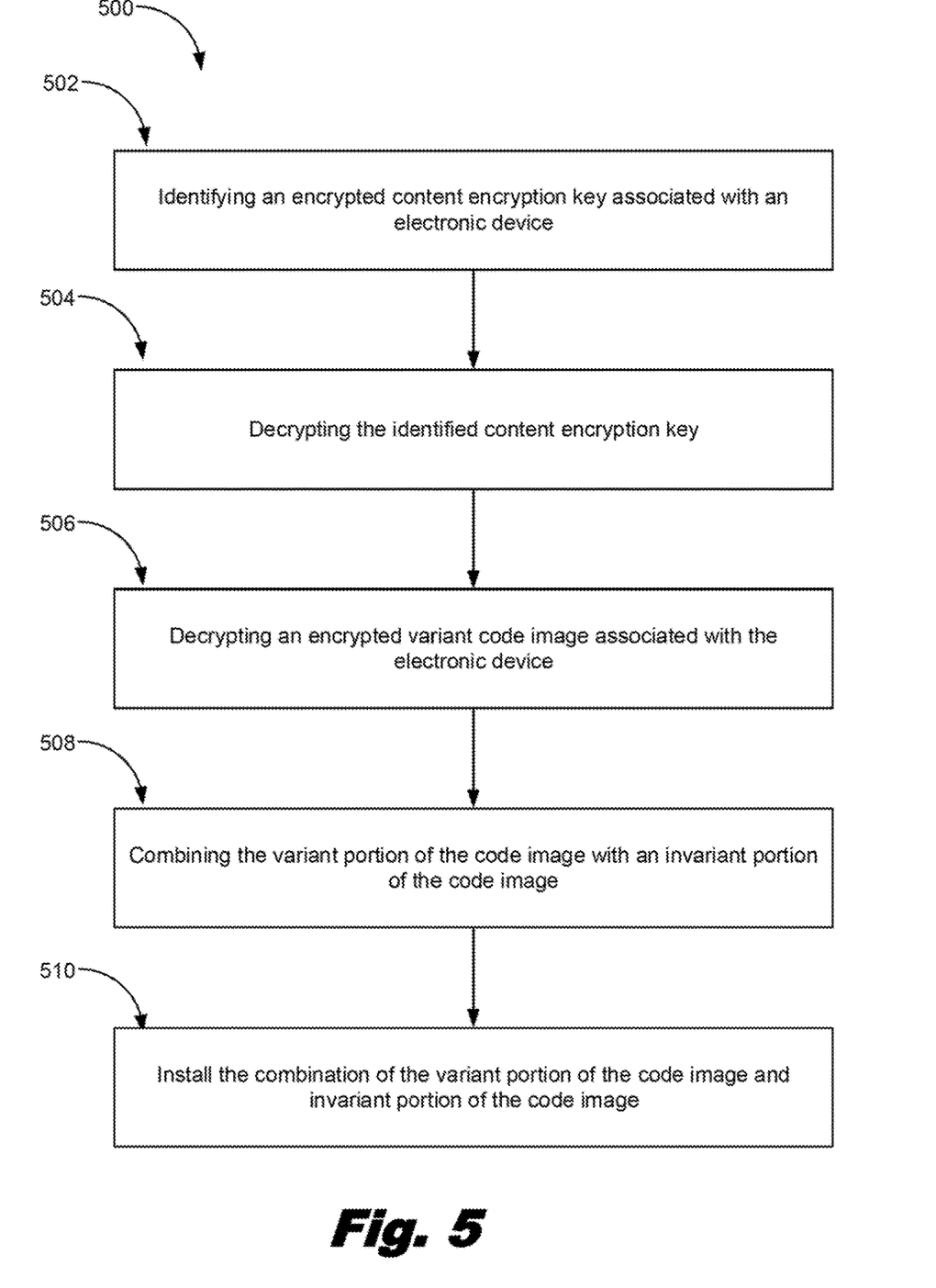
FIG. 5 is a flow diagram outlining an example method of code image distribution according to examples.

FIG. 5 illustrates an example flow diagram 500 that may be performed to install a code image. For example, the flow diagram may be performed by systems as described with reference to FIG. 1 above. In various examples, the processes described in reference to flow diagram 500 may be performed in a different order or the flow diagram may include fewer or additional blocks than are shown in FIG. 5. For example, if a bundle signature is included, an additional process may be implemented to validate the signature.

Beginning in block 502, an electronic device identifies an encrypted content encryption key associated with the electronic device. The encrypted content encryption key may be identified based on characteristics of the electronic device. For example, a set of encrypted content encryption keys may be stored with a fingerprint based on characteristics of electronic devices. The fingerprint may be based on serial number, model numbers, location, manufacture date, or a combination of characteristics of an electronic device, for instance. The fingerprint may correspond to one or more electronic devices that share a private key that can decrypt the identified encrypted content encryption key.

In block 504, the electronic device decrypts the identified encrypted content encryption key using a private key of the electronic device. In some examples, the electronic device may use multiple keys to decrypt to encrypted content encryption key. As described above, the private key may be stored on the electronic device during manufacture or installation and the content encryption key may be mapped to the electronic device through one or more characteristics of the electronic device. Because the encrypted content encryption key is encrypted with a key associated with a particular electronic device or set of electronic devices, it cannot be decrypted by other electronic devices that receive the code image bundle.

In block 506, the electronic device decrypts an encrypted variant code image using the decrypted content encryption key. The encrypted variant code image may be stored in a manner associated with the encrypted variant code image. For example, it may be stored with the same fingerprint. In some examples, the content encryption key is encrypted and stored with an indicator of which variant portion of a code image it is associated with.

In block 508, the electronic device combines the variant portion of the code image with an invariant portion of the code image to generate a complete code image. For example, the invariant portion of the code image may be provided in the same code image bundle as the variant portion of the code image. The invariant portion of the code image may be encrypted similar to the variant portion of the code image with a key common to the electronic devices that receive the code image bundle. In some examples, the invariant portion of the code image may be sent separately from the variant portion of the code image. To combine the variant portion and the invariant portion, the electronic device may append the invariant portion, or the variant portion may operate as a patch to modify the invariant portion of the code image. In some examples, the invariant portion and the variant portion may be combined in another manner. In block 510, the electronic device installs the complete code image. For example, the complete code image may be installed as a software or firmware update to the electronic device, a new application for the electronic device, or another application.

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. In various examples other non-transitory computer-readable storage medium may be used to store instructions for implementation by processors as described herein. Accordingly, some examples provide a program comprising code for implementing a system or method as claimed in any preceding claim and a machine-readable storage storing such a program.

The features disclosed in this specification (including any accompanying claims, abstract and drawings), and/or the operations or processes of any method or process so disclosed, may be combined in any combination, except combinations where at least some of such features and/or processes are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is an example of a generic series of equivalent or similar features.

The invention claimed is:

1. A method comprising:
   encrypting, using an invariant content encryption key, an invariant portion of a code image for a set of electronic devices to generate an encrypted invariant portion of the code image for the set of electronic devices;
   encrypting, using a first variant content encryption key, a first variant of a variant portion of the code image for the set of electronic devices to generate a first encrypted variant portion of the code image for the set of electronic devices;
   encrypting, using a second variant content encryption key, a second variant of the variant portion of the code image for the set of electronic devices to generate a second encrypted variant portion of the code image for the set of electronic devices, wherein the first encrypted variant portion of the code image for the set of electronic devices is different than the second encrypted variant portion of the code image for the set of electronic devices; and
   generating a code image bundle comprising the encrypted invariant portion of the code image for the set of electronic devices, the first encrypted variant portion of the code image for the set of electronic devices, and the second encrypted variant portion of the code image for the set of electronic devices.

2. The method of claim 1, further comprising:
   encrypting the first variant content encryption key and the second variant content encryption key; and
   including the encrypted first variant content encryption key and the encrypted second variant content encryption key in the code image bundle.

3. The method of claim 1, further comprising:
   encrypting the invariant content encryption key; and
   including the encrypted invariant content encryption key in the code image bundle.

4. The method of claim 1, further comprising:
   generating a signature of the code image bundle; and
   providing the signature of the code image bundle with the code image bundle to a set of electronic devices associated with the code image for the set of electronic devices.

5. The method of claim 1, further comprising:
   generating the first variant of the variant portion of the code image for the set of electronic devices to provide to a first subset of electronic devices associated with the code image for the set of electronic devices; and
   generating the second variant of the variant portion of the code image for the set of electronic devices to provide to a second subset of electronic devices associated with the code image for the set of electronic devices.

6. The method of claim 1, wherein the code image for the set of electronic devices comprises a firmware update to a plurality of printing systems.

7. A non-transitory computer-readable storage medium storing a set of instructions executable by a processor to:
   identify an encrypted content encryption key associated with an electronic device from a plurality of encrypted content encryption keys;
   decrypt the identified encrypted content encryption key using a private key of the electronic device;
   decrypt an encrypted variant code image associated with the electronic device using the decrypted content encryption key to generate a variant portion of a code image;
   combine the variant portion of the code image with an invariant portion of the code image to generate a complete code image; and
   install the complete code image on the electronic device.

8. The non-transitory computer-readable storage medium of claim 7, wherein the set of instructions further cause the processor to identify the encrypted variant code image associated with the electronic device from a plurality of encrypted variant code images received in a code image bundle.

9. The non-transitory computer-readable storage medium of claim 7, wherein the set of instructions further cause the processor to identify the encrypted content encryption key comprises identifying the encrypted content encryption key based a fingerprint of the electronic device.

10. The non-transitory computer-readable storage medium of claim 7, wherein the set of instructions further cause the processor to:
    decrypt an encrypted invariant content encryption key to generate an invariant content encryption key; and
    decrypt, using the invariant content encryption key, an encrypted invariant code image to generate the invariant portion of the code image.

11. The non-transitory computer-readable storage medium of claim 7, wherein the set of instructions further cause the processor to receive a code image bundle comprising an encrypted invariant portion of the code image, a plurality of encrypted variant portions of the code image, and the plurality of encrypted content encryption keys.

12. A method comprising:
    encrypting, using an invariant content encryption key, an invariant portion of a code image for a set of electronic devices to generate an encrypted invariant portion of the code image for the set of electronic devices;
    encrypting, using variant content encryption keys, a plurality of variations of a variant portion of the code image for the set of electronic devices to generate a plurality of encrypted variations of the variant portion of the code image for the set of electronic devices, wherein the variant content encryption keys are associated with a subset of the set of electronic devices based at least in part on a characteristic of the set of electronic devices;

encrypting the variant content encryption keys associated with the plurality of variations of the variant portion of the code image for the set of electronic devices to generate encrypted content encryption keys; and constructing a code image bundle comprising the encrypted variant content encryption keys associated with the plurality of variations of the variant portion of the code image for the set of electronic devices, the encrypted invariant portion of the code image for the set of electronic devices, and the plurality of encrypted variations of the variant portion of the code image for the set of electronic devices.

13. The method of claim 12, further comprising:

receiving a request to provide a code image for a plurality of electronic devices; and identifying the plurality of variations of the variant portion of the code image for the set of electronic devices to encrypt based on the request.

14. The method of claim 12, wherein encrypting the plurality of variations of the variant portion of the code image for the set of electronic devices further comprises:

encrypting a first variation of the variant portion of the code image for the set of electronic devices a first time with a first variant content encryption key; and encrypting the first variation of the variant portion of the code image for the set of electronic devices a second time with a second variant content encryption key, wherein the first variant content encryption key is associated with a first characteristic of a first electronic device to receive the first variant content encryption key and the second variant content encryption key is associated with a second characteristic of the first electronic device.

15. The method of claim 14, wherein the first characteristic of the first electronic device and the second characteristic of the first electronic device are components in a serial number of the first electronic device.

* * * * *